United States Patent
Zhang et al.

(10) Patent No.: US 12,398,512 B2
(45) Date of Patent: Aug. 26, 2025

(54) STEEL CORD FOR RUBBER REINFORCEMENT

(71) Applicant: NV Bekaert SA, Zwevegem (BE)

(72) Inventors: Aijun Zhang, Jiangyin (CN); Haijun Ma, Jiangyin (CN); Yaodong Li, Jiangyin (CN)

(73) Assignee: NV BEKAERT SA, Zwevegem (BE)

(*) Notice: Subject to any disclaimer, the term of this patent is extended or adjusted under 35 U.S.C. 154(b) by 85 days.

(21) Appl. No.: 18/268,719

(22) PCT Filed: Nov. 30, 2021

(86) PCT No.: PCT/EP2021/083630
§ 371 (c)(1),
(2) Date: Jun. 21, 2023

(87) PCT Pub. No.: WO2022/135851
PCT Pub. Date: Jun. 30, 2022

(65) Prior Publication Data
US 2023/0392319 A1   Dec. 7, 2023

(30) Foreign Application Priority Data
Dec. 22, 2020  (WO) ............... PCT/CN2020/138266

(51) Int. Cl.
D07B 1/06  (2006.01)
(52) U.S. Cl.
CPC .... *D07B 1/0606* (2013.01); *D07B 2201/1028* (2013.01); *D07B 2201/1044* (2013.01);
(Continued)

(58) Field of Classification Search
CPC .......... D07B 1/0606; D07B 2201/1028; D07B 2201/1044; D07B 2201/2022; D07B 2201/2067; D07B 2205/3025
See application file for complete search history.

(56) References Cited

U.S. PATENT DOCUMENTS 4,258,543 A      3/1981  Canevari et al.
4,836,262 A  *   6/1989  Nishizawa ........... D07B 1/0646
                                                    57/902

(Continued)

FOREIGN PATENT DOCUMENTS

JP      4608270     * 10/2010
WO   2020/021007      1/2020
WO   2020/074308      4/2020

OTHER PUBLICATIONS

International Search Report and Written Opinion of the International Search Authority issued Mar. 25, 2022 in International (PCT) Application No. PCT/EP2021/083630.

*Primary Examiner* — Uyen T Nguyen
(74) *Attorney, Agent, or Firm* — Wenderoth, Lind & Ponack, L.L.P.

(57) ABSTRACT

The invention provides a steel cord with a construction of n×1, n is the number of the steel filaments of the steel cord, the steel cord has an elongation at 2.5N-50N of less than 1.2% and a twist pitch of greater than 16 mm, each of the steel filaments has a form of helical wave with a wave length L expressed in mm and a wave height H expressed in mm when being unravelled from said steel cord, L is greater than 16 mm, each of the steel filaments has a space volume Vs satisfying that, $Vs = L \times H^2 \times \pi/4$, and $Vs > 20$ mm$^3$. The invention steel cord is beneficial for the stress distribution.

12 Claims, 1 Drawing Sheet

Figure 1:
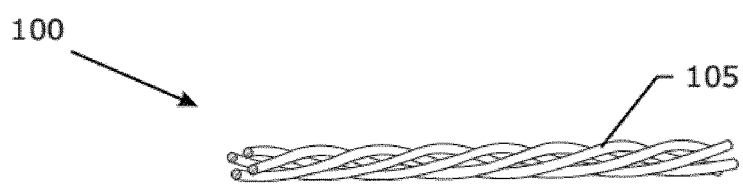

(52) U.S. Cl.
CPC ............ *D07B 2201/2022* (2013.01); *D07B 2201/2067* (2013.01); *D07B 2205/3025* (2013.01)

(56) References Cited

U.S. PATENT DOCUMENTS

| | | | | |
|---|---|---|---|---|
| 4,938,015 | A * | 7/1990 | Kinoshita | D07B 1/0646 57/902 |
| 2001/0027836 | A1* | 10/2001 | Miyazaki | B60C 9/0007 152/450 |
| 2002/0185205 | A1* | 12/2002 | Miyazaki | D07B 1/0646 152/526 |
| 2003/0116248 | A1* | 6/2003 | Miyazaki | D07B 1/0646 57/200 |
| 2003/0221762 | A1 | 12/2003 | Miyazaki et al. | |
| 2004/0060632 | A1* | 4/2004 | Miyazaki | B60C 9/0007 152/543 |
| 2006/0065341 | A1* | 3/2006 | Sarashi | B60C 9/0007 152/451 |
| 2010/0300596 | A1* | 12/2010 | Naoi | D07B 1/0646 152/527 |
| 2017/0321376 | A1 | 11/2017 | Calvet et al. | |

\* cited by examiner

STEEL CORD FOR RUBBER REINFORCEMENT

TECHNICAL FIELD

The invention relates to a steel cord for rubber reinforcement. The invention also relates to a rubber article reinforced by the steel cords.

BACKGROUND ART

Steel cord is widely used as a reinforcement for rubber product, such as rubber belt, rubber tire, hose and etc.

As a reinforcement for rubber product, the steel cord is required to have a certain strength, corrosion resistance, fatigue resistance, rubber penetration property, rubber adhesion property and etc. Rubber penetration property is one property of the steel cord showing in what extent the rubber can penetrate into the steel cord. The rubber penetrates into the steel cord and fills the gaps among the steel wires and thereby reduces the cavity inside the steel cord, thereby the moisture is prevented to enter into the steel cord, and this avoids the steel wires of the steel cord to be corroded, this ensures the long lifetime of the steel cord. High rubber penetration property is always desired for a steel cord.

Open steel cord is one type of steel cord which is developed for high rubber penetration property. Open steel cord means that the steel cord has quite a lot gaps between the steel wires which make the rubber penetrating into the steel cord relatively easier.

U.S. Pat. No. 4,258,543 discloses an open steel cord, the open steel cord has 3 to 5 steel wires, and the open steel cord has a diameter greater than the diameter of the same cord in the compact geometric configuration.

However, sometimes, at the shoulder portion of the tire, the open steel cords separate with the rubber, this is so called shoulder separation problem, and this problem leads to failure of the tire.

DISCLOSURE OF INVENTION

The primary object of the invention is to solve the problem of the prior art.

The first object of the invention is to provide a steel cord.

The second object of the invention is to provide a tire reinforced by the invention steel cords.

According to a first aspect of the invention, a steel cord is provided. The steel cord has a construction of n×1, n is the number of the steel filaments of the steel cord, the steel cord has an elongation at 2.5N-50N of less than 1.2% and a twist pitch of greater than 16 mm, each of the steel filaments has a form of helical wave with a wave length L expressed in mm and a wave height H expressed in mm when being unravelled from the steel cord, L is greater than 16 mm, each of the steel filaments has a space volume Vs satisfying that, $Vs = L \times H^2 \times \pi/4$, and $Vs > 20$ mm$^3$.

The big space volume of the steel filament is beneficial for the stress distribution around the steel cord as well as along the length of the steel cord. Particularly at the portion of tire shoulder the stress concentration is relatively more severe and sometimes leads to tire shoulder separation problem. The use of the invention steel cord results in better stress distribution, thereby the risk of the tire shoulder separation is reduced.

Preferably, Vs is greater than 23 mm$^3$. More preferably, Vs is greater than 30 mm$^3$. Most preferably, Vs is greater than 35 mm$^3$. Vs is preferably smaller than 200 mm$^3$.

When the steel filaments are unravelled from the steel cord, each of the steel filaments is observed with a helical wave form, i.e., three dimensional wave. When the steel filament is projected on a screen, its silhouette is a two-dimensional wave with a wave length and a wave height, and the wave length and the wave height of the two-dimensional wave of the silhouette are deemed as the wave length and the wave height of the helical wave of the steel filament.

Preferably, the wave length L is greater than 20 mm. More preferably, the wave length L is greater than 24 mm and smaller than 40 mm.

Preferably, the steel cord has a twist pitch of greater than 20 mm. More preferably, the steel cord has a twist pitch of greater than 24 mm and smaller than 40 mm.

According to the present invention, the steel cord has an elongation at break of less than 5.0%.

"Elongation at 2.5N-50N" is the elongation between 2.5N and 50N expressed in percent.

According to the present invention, n ranges from 2-7.

Preferably, the steel filament has a tensile strength of more than 4000-2000×D MPa when being unravelled from the steel cord, D being the diameter of the steel filament expressed in mm. More preferably, steel filament has a tensile strength of more than 4200-2000×D MPa. The higher tensile strength of steel filament is benefit for the diameter reduction of the steel filament and the steel cord and thereby benefit for the weight reduction of the tire.

One use of the invention steel cord is for rubber reinforcement.

According to a second aspect of the invention, a tire is provided. The tire comprises at least one belt layer, at least one carcass layer, at least one tread layer and a pair of bead portions, the belt layer and/or the carcass layer comprises at least one steel cord with a construction of n×1, n is the number of the steel filaments of said steel cord, the steel cord has an elongation at 2.5N-50N of less than 1.2% and a twist pitch of greater than 16 mm, each of the steel filaments has a form of helical wave with a wave length L expressed in mm and a wave height H expressed in mm when being unravelled from the steel cord, L is greater than 16 mm, each of the steel filaments has a space volume Vs satisfying that, $Vs = L \times H^2 \times \pi/4$, and $Vs > 20$ mm$^3$.

BRIEF DESCRIPTION OF FIGURES IN THE DRAWINGS

FIG. 1 describes a steel cord of the invention.

Figure 2A:
Figure 2B:
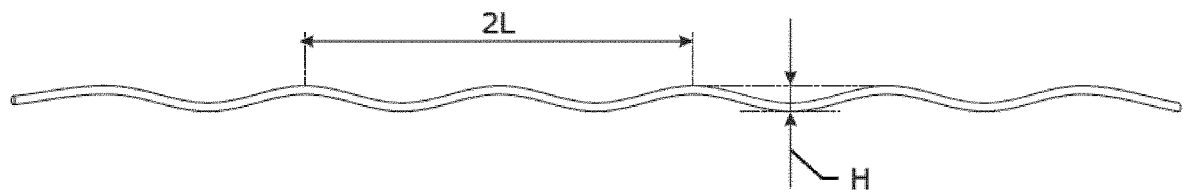

FIG. 2a-2b describes the steel filament unravelled from the steel cord and the corresponding wave length and wave height.

MODE(S) FOR CARRYING OUT THE INVENTION

The steel filaments for steel cord are made from a wire rod.

The wire rod is firstly cleaned by mechanical descaling and/or by chemical pickling in a H$_2$SO$_4$ or HCl solution in order to remove the oxides present on the surface. The wire rod is then rinsed in water and is dried. The dried wire rod is then subjected to a first series of dry drawing operations in order to reduce the diameter until a first intermediate diameter.

At this first intermediate diameter D1, e.g. at about 3.0 to 3.5 mm, the dry drawn steel filament is subjected to a first intermediate heat treatment, called patenting. Patenting means first austenitizing until a temperature of about 1000° C. followed by a transformation phase from austenite to pearlite at a temperature of about 600-650° C. The steel filament is then ready for further mechanical deformation.

Thereafter the steel filament is further dry drawn from the first intermediate diameter until a second intermediate diameter in a second number of diameter reduction steps. The second diameter typically ranges from 1.0 mm to 2.5 mm.

At this second intermediate diameter, the steel filament is subjected to a second patenting treatment, i.e. austenitizing again at a temperature of about 1000° C. and thereafter quenching at a temperature of 600 to 650° C. to allow for transformation to pearlite.

If the total reduction in the first and second dry drawing step is not too big a direct drawing operation can be done from wire rod till second intermediate diameter.

After this second patenting treatment, the steel filament is usually provided with a brass coating: copper is plated on the steel filament and zinc is plated on the copper. A thermos-diffusion treatment is applied to form the brass coating. Alternatively, the steel filament can be provided with a ternary alloy coating, including copper, zinc and a third alloy of cobalt, titanium, nickel, iron or other known metal.

The brass-coated or the ternary alloy coated steel filament is then subjected to a final series of cross-section reductions by means of wet drawing machines. The final product is a steel filament with a carbon content higher than 0.70 percent by weight, or no less than 0.80 percent by weight, or even higher than 0.90 percent by weight, with a tensile strength (TS) typically above 3000 MPa and adapted for the reinforcement of rubber products.

Steel filaments adapted for the reinforcement of tires typically have a final diameter D ranging from 0.05 mm to 0.60 mm, e.g. from 0.10 mm to 0.40 mm. Examples of wire diameters are 0.10 mm, 0.12 mm, 0.15 mm, 0.175 mm, 0.18 mm, 0.20 mm, 0.22 mm, 0.245 mm, 0.28 mm, 0.30 mm, 0.32 mm, 0.35 mm, 0.38 mm, 0.40 mm. Better that the diameter the steel filament D is in the range of 0.10 mm-0.50 mm.

A number of steel filaments are twisted by the existing steel cord making process, i.e. cabling or bunching process, to form a steel cord, and the steel filaments are pre-formed in the existing preforming method prior to being twisted to form a cord. The pre-determined wave height of the steel filament is realized by adjusting the preforming on the steel filament, the pre-determined wave length of the steel filament is realized by adjusting the preforming on the steel filament and the twisting process, thereby the unravelled steel filament with the pre-determined space volume is reached. Although the wave length and wave height of the steel filament are measured when the steel filament is unravelled from the steel cord, the unravelling operation won't bring any substantial change to the wave length and the wave height of the steel filament.

FIG. 1 illustrates one embodiment of the invention. The steel cord 100 comprises four steel filaments 105 with a diameter of 0.38 mm. FIG. 2a illustrates the steel filament 105 unravelled from the steel cord 100, FIG. 2b illustrates the wave length L and wave height H of the steel filament 105 according to the measurement method. The detail of the measurement method of the wave length and wave height is:

first, cut the steel cord 100 with a certain length as a sample, such as 100-150 mm, unravel the steel filaments 105 from the steel cord sample, second, project one steel filament 105 and make the silhouette of the middle part of the steel filament 105 on the screen, third, measure the distance of two subsequent wave lengths (i.e. from one peak to the next second peak) and divide by two to determine the wave length; measure the distance between the valley and the imaginary base line between the two peaks to determine the wave height, fourth, repeat 5 pieces of the same steel filament 105 and calculate the average values, the average values are the wave length L and the wave height H.

Following Table 1 summarizes the performance of the invention steel cord comparing with the reference.

TABLE 1

|  | Invention 1 | Invention 2 | Reference |
|---|---|---|---|
| Construction | 4 × 1 | 6 × 1 | 4 × 1 |
| Filament diameter (mm) | 0.38 | 0.38 | 0.38 |
| L (mm) | 27.97 | 29.04 | 20.43 |
| H (mm) | 1.40 | 1.90 | 0.98 |
| Vs (mm$^3$) | 43 | 82 | 15 |
| Fatigue test (k circles) | 7306 | 16682 | 1986 |
| Elongation at break of cord (%) | 2.51 | 3.41 | 3.49 |
| Elongation at 2.5N-50N (%) | 0.35 | 0.63 | 0.30 |
| Twist pitch of cord (mm) | 27 | 28 | 20 |
| Tensile strength of steel filament (MPa) | 3592 | 3593 | 3588 |

Fatigue test is a test to know to what extent the steel cord will separate from the rubber. The fatigue test has the following steps:

fuse the steel cord into 15 small pieces with a length of 330 mm, cut small pieces at the central portion to get 30 small steel cord samples, make sure that the cut end of the small steel cord sample is not flare;

prepare a rubber strip with a size of 203 mm×35 mm×6.4 mm (length×width×height) and a rubber cover with the same size as the rubber strip;

put the end portions of the small steel cord samples (with a length of 12.5 mm and including the cut end) on the rubber strip, arrange the 15 small steel cord samples separately along one side of the rubber block and put another 15 small steel cord samples separately along the opposite side of the rubber strip, make sure that one small steel cord sample on one side of the rubber strip has the same horizontal axis as the corresponding small steel cord sample on the opposite side, put the rubber cover on the rubber strip and the small steel cord samples to make the rubber block, and then cure the rubber block;

identify the No. 2, 4, 6, 9, 11, 13 small steel cord samples along the length of the rubber block, cut the rubber block to take out the small blocks with a length about 22 mm, make sure that each small block is inserted with two small steel cord samples in its central position, then fix the steel cords of each small block by two clamps along the vertical axis, and then give a vibration force to the small block with a pre-determined frequency and amplitude under room temperature, and record the repeated circles of the vibration force till the steel cord separate with the small block.

Compared with the reference steel cord, the invention steel cords have a better capability to suffer more times of vibrations until they separate with the rubber blocks, and this proves that the invention steel cord contributes to better stress distribution.

The invention claimed is:

1. A steel cord having a construction of n×1,
wherein the steel cord has n number of steel filaments, n ranging from 2-7,
wherein the steel cord has an elongation between 2.5N and 50N of less than 1.2%,
wherein the steel cord has a twist pitch of greater than 20 mm,
wherein each of the steel filaments has a form of helical wave with a wave length L expressed in mm and a wave height H expressed in mm when being unravelled from the steel cord,
wherein the L is greater than 16 mm, and
wherein each of the steel filaments has a space volume Vs satisfying:

$$Vs = L \times H^2 \times \pi/4, \text{ and}$$

Vs is greater than 20 mm³ and smaller than 200 mm³.

2. The steel cord as claimed in claim 1, wherein the Vs is greater than 23 mm³ and smaller than 200 mm³.

3. The steel cord as claimed in claim 2, wherein the Vs is greater than 30 mm³ and smaller than 200 mm³.

4. The steel cord as claimed in claim 3, wherein the Vs is greater than 35 mm³ and smaller than 200 mm³.

5. The steel cord as claimed in claim 1, wherein the wave length L is greater than 20 mm.

6. The steel cord as claimed in claim 5, wherein the wave length L is greater than 24 mm and smaller than 40 mm.

7. The steel cord as claimed in claim 1, wherein the twist pitch of steel cord is greater than 24 mm and smaller than 40 mm.

8. The steel cord as claimed in claim 1, wherein the steel cord has an elongation at break of less than 5.0%.

9. The steel cord as claimed in claim 1, wherein each of the steel filaments has a tensile strength of more than 4000-2000×D MPa when being unravelled from the steel cord, D being the diameter of each steel filament expressed in mm.

10. The steel cord as claimed in claim 9, wherein each of the steel filaments has a tensile strength of more than 4200-2000×D MPa.

11. A tire comprising at least one belt layer, at least one carcass layer, at least one tread layer and a pair of bead portions, wherein the belt layer and/or the carcass layer comprises at least one steel cord as claimed in claim 1.

12. The steel cord as claimed in claim 1, wherein each of the steel filaments has a diameter D ranging from 0.10 mm to 0.50 mm.

* * * * *